United States Patent [19]
Zehrung, Jr.

[11] 3,734,197
[45] May 22, 1973

[54] KNIFE STRUCTURE FOR A KNIFE REEL

[75] Inventor: Claude D. Zehrung, Jr., Englewood, Colo.

[73] Assignee: Rental Equipment Manufacturing Co., Englewood, Colo.

[22] Filed: July 22, 1971

[21] Appl. No.: 165,235

[52] U.S. Cl. .................... 172/21, 172/123, 172/719, 172/772
[51] Int. Cl. .............................................. A01b 45/02
[58] Field of Search .................... 172/13, 21, 22, 118, 172/121, 122; 56/294, 295

[56] References Cited

UNITED STATES PATENTS

| 2,877,619 | 3/1959 | Benson et al. | 56/295 |
| 2,627,156 | 2/1953 | Carter | 56/295 |
| 3,465,507 | 9/1969 | Fishaw | 56/294 |
| 1,744,597 | 1/1930 | Vasconcellos | 56/295 |

FOREIGN PATENTS OR APPLICATIONS 831,727  3/1960  Great Britain .......................... 172/21

Primary Examiner—Robert E. Pulfrey
Assistant Examiner—R. T. Rader
Attorney—Horace B. Van Valkenburgh et al.

[57] ABSTRACT

A knife structure for the knife reel of a turf conditioning apparatus which is mounted upon a square sectioned reel shaft. The knife structure uses replaceable sickle blades. The base of each blade is abutted against an end of a rectangular spacer plate so that the two blades extend from the plate in spaced opposition. A cover plate at each side of the spacer plate overlies the spacer plate and the base edge of each of the blades so that the spacer plate and the base portions of the blades are sandwiched between the cover plates. Holes at each end of the cover plates register with holes at the base of the cutter blades to receive bolts, and the assembly is secured together by tightening these bolts with nuts. A square opening extends through the cover plates and the spacer plate at the center of the knife structure, this opening fitting securely upon the square shaft. Tubular spacers threaded upon the shaft hold the assembly in position.

7 Claims, 10 Drawing Figures

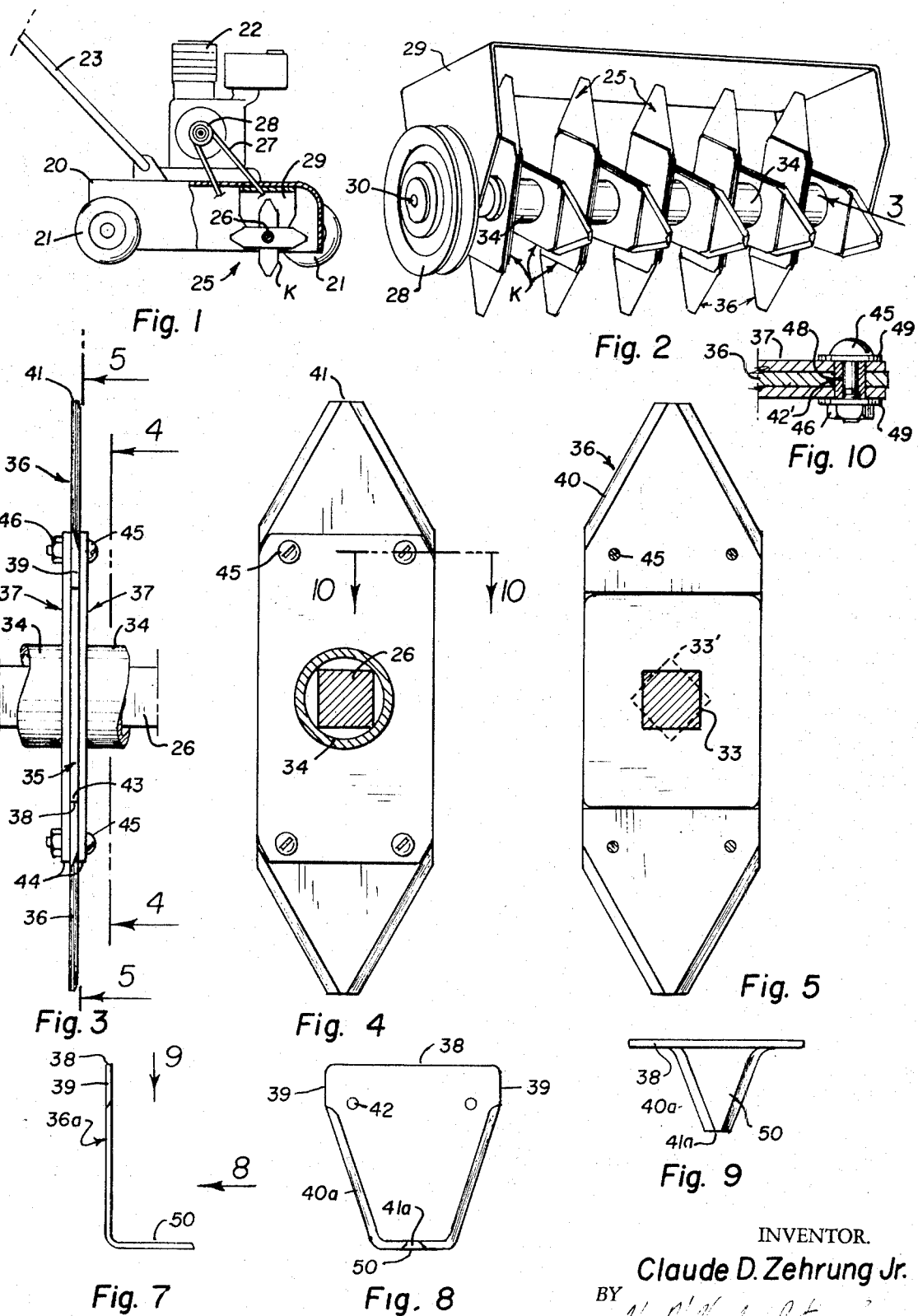

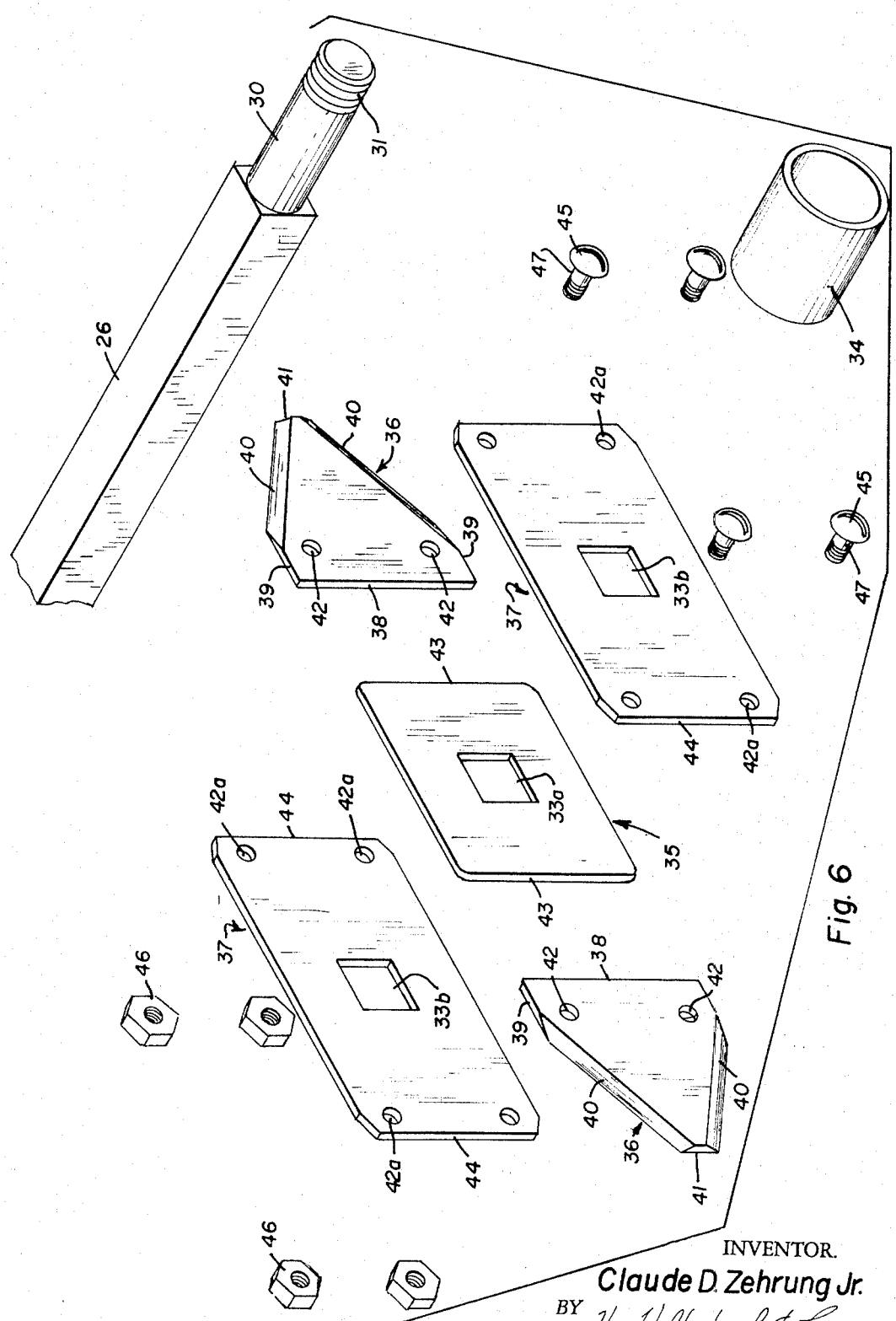

KNIFE STRUCTURE FOR A KNIFE REEL

The present invention relates to apparatus which uses flails or knives to condition turf by removing dead grass, cutting runners and tilling and aerating the soil. The invention relates, more particularly, to rotary knives for such apparatus.

A turf conditioning apparatus using rotary flails or knives is commonly mounted upon a vehicle which carries its power supply, usually a gasoline engine. This engine drives a shaft which is mounted in the vehicle transversely to the normal direction of vehicle travel, and the shaft carries an array of swinging flails or fixed knives to strike the turf and the ground surface as the shaft rotates. In many units this shaft and the flails or knives mounted upon it constitute a removable and replaceable sub-assembly which is commonly referred to as a flail reel or a knife reel. The present invention concerns improvements in the construction of knives for such a knife reel; accordingly, the invention will be called A KNIFE STRUCTURE FOR A KNIFE REEL. The same is herein described as being for turf conditioning apparatus, but it is to be understood that the invention is not to be limited by such a specific application.

An object of the invention is to provide a novel and improved knife structure for a knife reel which is solidly and securely carried upon the reel shaft and which will effectively remove dead grass, cut the turf and cut into the soil below the turf as the shaft is rotated.

Another object of the invention is to provide a knife structure for a knife reel which has easily replaceable cutter blades and which may use either standard, readily available mower blades as replacements or, if desired, any special type of blade for specific purposes.

Another object of the invention is to provide a novel and improved knife structure for a knife reel, wherein an array of knives may be carried upon the reel at various desired spacings along the reel and at suitable radial positions about the reel.

Other objects of the invention are to provide a novel and improved structure of a knife for a turf cutting reel which is simple, versatile, economical, rugged and durable.

With the foregoing and other objects in view, of all which more fully hereinafter appear, my invention comprises certain constructions, combinations and arrangements of parts and elements as hereinafter described, defined in the appended claims and illustrated in the accompanying drawings, in which:

FIG. 1 is a diagrammatic side elevational view of a vehicle for conditioning turf with portions of the frame of the vehicle broken away to show the improved knife reel.

FIG. 2 is a perspective view of a knife reel such as may be used in the vehicle shown at FIG. 1 and which carries knives constructed according to the present invention.

FIG. 3 is a front view of a fragment of the knife reel and an edge view of a knife thereon, as taken from the indicated arrow 3 at FIG. 2.

FIG. 4 is a sectional view of the reel shaft and spacer thereon, and a side view of a knife on the shaft, as taken from the indicated line 4—4 at FIG. 3.

FIG. 5 is a sectional view of the knife structure and of the reel shaft, as taken from the indicated line 5—5 at FIG. 3.

FIG. 6 is an exploded view of the components forming a knife structure and also a fragmentary portion of the reel shaft wherein the knife structure is mounted.

FIG. 7 is an edge view of a knife blade per se, but showing a modified form from that illustrated at FIGS. 3 to 6.

FIG. 8 is a side elevational view of the blade shown at FIG. 7, as from the indicated arrow 8 at FIG. 7.

FIG. 9 is a plan view of the blade as from the indicated arrow 9 at FIG. 7.

FIG. 10 is a fragmentary sectional detail as taken from the indicated line 10—10 at FIG. 4, but on an enlarged scale and showing a modified construction of the connection of a blade to the knife structure.

Referring more particularly to the drawing, a turf conditioning apparatus is depicted at FIG. 1. This unit is a wheel-mounted vehicle having a body structure 20 in the general form of an inverted rectangular pan with the wheel 21 thereof being mounted upon each side of the body. A gasoline driven engine 22 upstands from the deck of the body. The engine may drive the vehicle in any suitable manner, and its controls are ordinarily located on a push handle 23. Such a drive and the controls therefor are not shown since they are conventional. The engine 22 also drives a knife reel 25 having its shaft 26 transversely disposed with respect to the normal direction of movement of the vehicle.

The knife reel 25 is carried within the body 20. Its shaft 26 protrudes through one side of this body, and it is operatively connected to the engine 22 by a belt 27 and pulleys 28 in a direct-connection arrangement. The shaft 26 carries an array of knife assemblies which rotate with the rotation of the shaft 26. In preferred construction, this shaft 26 is mounted upon a wide U-shaped bracket 29 which is conveniently fitted into the body of the turf conditioning vehicle as indicated at FIG. 1. Each end of the shaft is mounted in bearings, not shown, which are mounted on the legs of the bracket to carry pulleys 28 which, in turn, connect with the belt 27 extending from the engine 22.

As best illustrated at FIG. 6, the major reach of transverse reel shaft 26 is square in section, but its end portions are turned as at 20 to fit upon support bearings, and to carry a pulley 28. Also, one end of the shaft is threaded as indicated at 31, FIG. 6, to receive a take-up nut to provide a tight assembly when all components are mounted in position. The array of knives carried upon this square shaft have center openings 33 so they snugly fit upon the shaft 26. The number of knives to be used is optional, and in the unit shown at FIG. 2, ten knives K are provided which are positioned across the shaft and are held in place by short tubular spacers 34.

Each knife structure K is made up as an assembly of components including a rectangular spacer plate 35 having a square opening 33a at its center to fit tightly upon the shaft 26. A triangular knife blade 36 is abutted against each end of this spacer plate 35 to extend outwardly therefrom and the opposing blades are held in position by a pair of cover plates 37 which lie against the sides of the spacer plate, which include square openings 33b at their centers and which extend a short distance beyond the ends of the spacer plate to overlie and to connect with the blades 36, as hereinafter further described.

Each triangular knife blade 36 is preferably a standard 3-inch sickle blade of the type commonly used in powered mowers. Such blades, of hard, tempered steel, are standardized so they may be easily replaced. Thus, the spacer plate 35 and cover plates 37 are proportioned to accommodate the pair of opposing blades of a standard size. Each blade 36 is generally triangular with a flat, squared base edge 38, and with short side edges 39 perpendicular to the base edge to establish the width of the blade which, in the type selected, is three inches. The sides converge from the short side edges 39 as sharp, beveled side cutting edges 40 which extend to a blunted apex point 41 at the center of the blade. To complete the unit, two mounting holes 42 are located adjacent to the base, with a hole being adjacent to each side edge 39.

The spacer plate 35 has the same width as the blades 36 which abut against its opposite sides. The opposing ends 43 of this spacer plate are thus adapted to hold the ends 38 of the blades 36 in place, and the length of the spacer plate is such that the blades are set apart a selected distance as established by the size of the knife reel. The thickness of this spacer plate is the same as, or slightly less than, the thickness of the blades to permit the cover plates 37 to tightly grip each blade when all components are assembled and tightly tied together.

The cover plates 37 also have the same width as the spacer plate 35 and the blades 36. The length, however, exceeds the length of the spacer plate to permit each end edge 44 to overlap the base of a blade 36. A pair of holes 42a at each end of each spacer plate register with the holes 42 in the blades wherever the components forming the knife structure are positioned for assembly with a blade extending from each end of the structure. Thus, whenever the cover plates 37 sandwich the spacer plate and blades between them, the assembly may be completed by fitting bolts 45 into the holes 42 and 42a, securing these bolts with nuts 46, and tying the assembly together. These bolts 45 are subject to considerable impacting shear and bearing stresses when the knife reel is rapidly rotating with the blades which are striking the turf. Therefore, each is preferably hardened and formed with a solid shank 47 closely fitting the holes 42a in the cover plates, and the hole 42 in the blade.

FIG. 10 shows an alternate arrangement for bolting the plates together when the knife structure is subjected to abuse. The holes 42 and 42a are enlarged, and a tubular sleeve 48 is fitted therein with the bolt 45 being fitted into the sleeve, and with washers 49 at each side of the sleeve to hold it in place. As such, the sleeve provides greater resistance to shear and bearing impacts when the knife structure is in use.

The manner in which the array of knife structures K is mounted upon a shaft 26 to form a reel is simple and straightforward. The knives K are fitted into position upon the square shaft in an alternating arrangement with spacers 34 between them. Suitable spacers 34 are provided at the ends of the shaft to hole the array of knives in properly spaced positions upon the shaft between the support bearings which are not shown.

Variations to this arrangement above described are possible. As shown at FIG. 2, the knives K are arranged on the shaft 90° apart, and the holes 33 are preferably aligned on the axes of the spacer plate and cover plates. However, a different sequence of spacing about the shaft is possible. For example, where an arrangement of knives at 45 degrees is desired, certain of the knife structures may have the square center opening 33 oriented at 45 degrees with respect to the axis of the knife structure, as indicated by the broken lines 33' at FIG. 5. Another obvious manner to obtain yet another arrangement involves the use of a hexagonal shaft and a hexagonal opening in each knife structure K instead of the square opening 33.

In lieu of the flat triangular blades 36, blades of various types may be used, and FIGS. 7 to 9 show a modified blade 36a which has an out-turned end 50. The blade is essentially triangular, having a base 38, short sidewall portions 39 at each side of the base, a converging beveled side cutting edge 40a at each side which converges to a flat apex point 41a, but with the end portion 50 of the blade adjacent to the apex point being turned outwardly. The result is that the end of the blade cuts a swath in turf. Accordingly, this type of blade is useful for scalping turf and for similar purposes.

I have now described my invention in considerable detail; however, it is obvious that others skilled in the art can devise and build alternate and equivalent constructions which are nevertheless within the scope and spirit of the invention. Hence, I desire that my protection be limited, not by the constructions illustrated and described, but only by the proper scope of the appended claims.

I claim:

1. A knife structure for the knife reel of a turf conditioning apparatus and the like, wherein the knife reel includes a rotatable shaft having a section formed as a simple, regular polygon, and wherein the knife structure comprises, in combination therewith:
    a. a pair of blades formed as flat members, with each blade having a base edge and a side cutting edge;
    b. a rectangular spacer plate having: a thickness approximating but not exceeding the thickness of the blades, opposite ends against which the base edges of the blades may abut with the blades extending therefrom in spaced opposition to each other, and a hole at the center of the spacer plate formed as a simple regular polygon fitting upon the aforesaid shaft;
    c. a pair of cover plates arranged to lie against the sides of the spacer plate having a length exceeding the length of the spacer plate sufficiently to extend beyond each end thereof to lap against portions of blades abutted against the spacer plate, and a hole at the center of each cover plate in registration with the spacer plate hole and sized to fit upon the aforesaid shaft;
    d. a means to secure each blade to and between the extended lapping portions of the cover plates when the bases of the blades are abutted against the ends of the spacer; and
    e. said securing means includes at least two spaced, aligned holes arranged to pass through the lapping portions of the cover plates and the respective blade, said holes being located near the base edge of said blade, and a removable fastening pin means positioned through each aligned hole to retain said blade in abutted position against said spacer plate whereby the impact forces upon the side cutting edge are transferred to the abutting surface by fulcrum effect about the pin nearest the cutting edge.

2. In the organization defined in claim 1, wherein the polygon defined by the sections of the shaft and the aforesaid holes in the spacer plate and in the cover plates is a square with the sides of all of the holes being oriented upon the respective plates in the same manner to permit them to lie together when upon the shaft.

3. In the organization defined in claim 1, wherein the blade is a triangular member with each side cutting edge converging from the base to a blunted apex point.

4. In the organization defined in claim 3 wherein the apex portion of the blade is bent laterally with respect to the rest of the blade to cut a wide pattern in the turf.

5. A knife reel assembly for use in turf conditioning apparatus or the like comprising a rotor arranged to be mounted for rotation about its longitudinal axis and a plurality of cutting knives mounted on and spaced longitudinally along said rotor, said cutting knife includes:
 a. blade means having a flat blade member which includes a base edge and a side cutting edge;
 b. spacer means including an elongated flattened member having means for mounting said member on said rotor for rotation therewith and abutting means disposed at one end of said member and arranged to abut against the base edge of the blade means whereby the blade means extends radially outward from said rotor;
 c. cover means comprising at least two generally flat members fixedly positioned on each side of the spacer means so as to overlap at least a portion of said blade means; and
 d. means for securing said cover means to said blade means, said securing means including at least two removable fastener means inserted through aligned holes through said cover means and said blade means, said aligned holes being located near the base edge of said blade means whereby the base edge is held rigidly against the abutting means during rotation so that the impact forces on the cutting edge will be transferred to the abutting means.

6. A knife reel assembly as defined in claim 5, wherein:
 said abutting means includes surfaces at each end of the elongated flattened member and the mounting means comprises an aperture provided at the midpoint of said member;
 said blade means include two flat blade members, the base edge of each blade member arranged contiguous to an abutting edge on said spacer means, and said cover means is arranged to overlap a portion of each blade member whereby said blades are secured against the abutting surfaces of said spacer means.

7. A knife reel assembly as defined in claim 6, wherein:
 lines extended along said cutting edge and said base edge of said blade members form an acute angle.

* * * * *